March 20, 1934.  P. B. RENFREW  1,951,809
APPARATUS FOR EMPLOYING VACUUM ON POROUS LAMINATED FILTERING MECHANISM
Filed Aug. 29, 1928  5 Sheets-Sheet 1

Inventor:
Paul B. Renfrew
By Nissen & Crane
Attys.

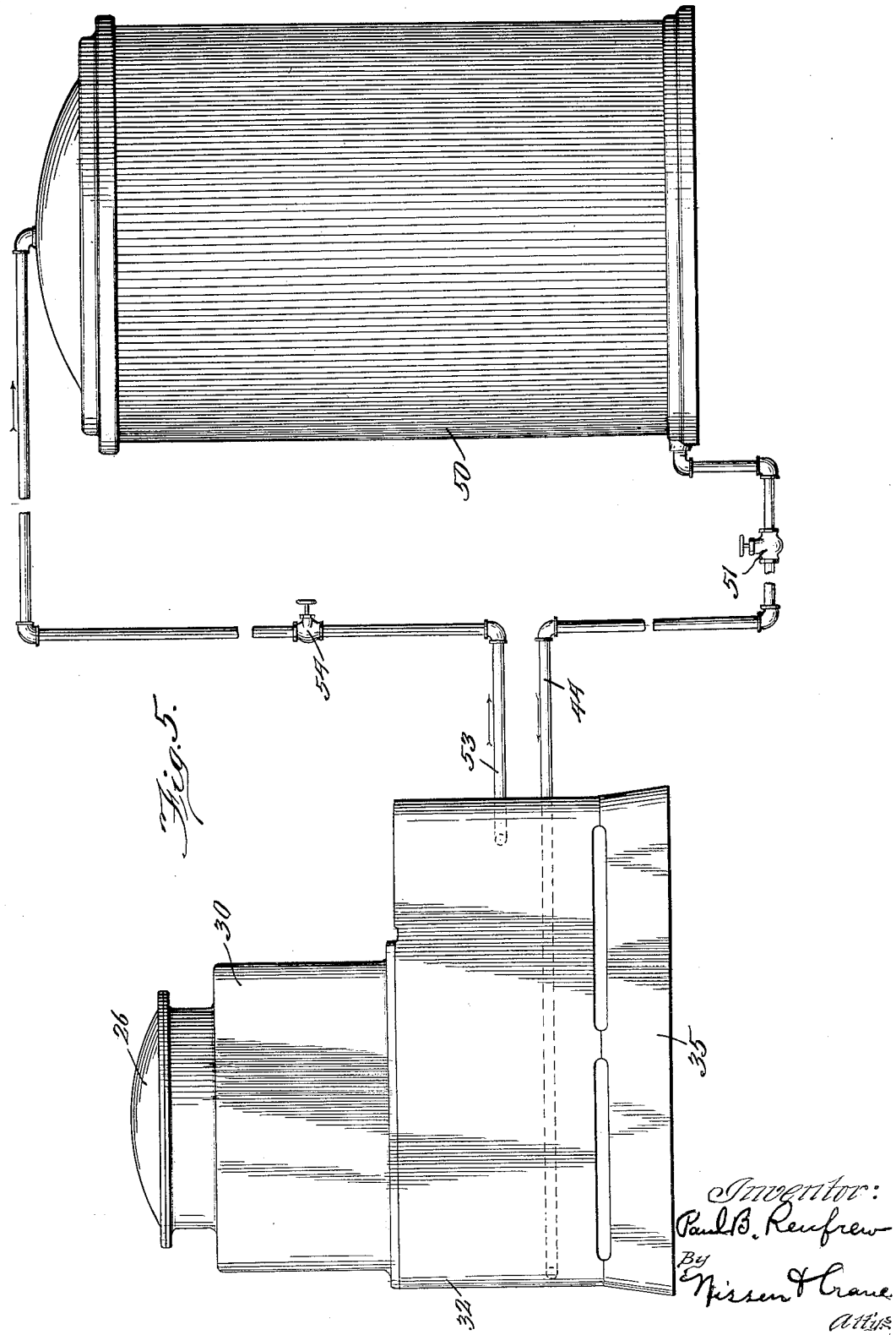

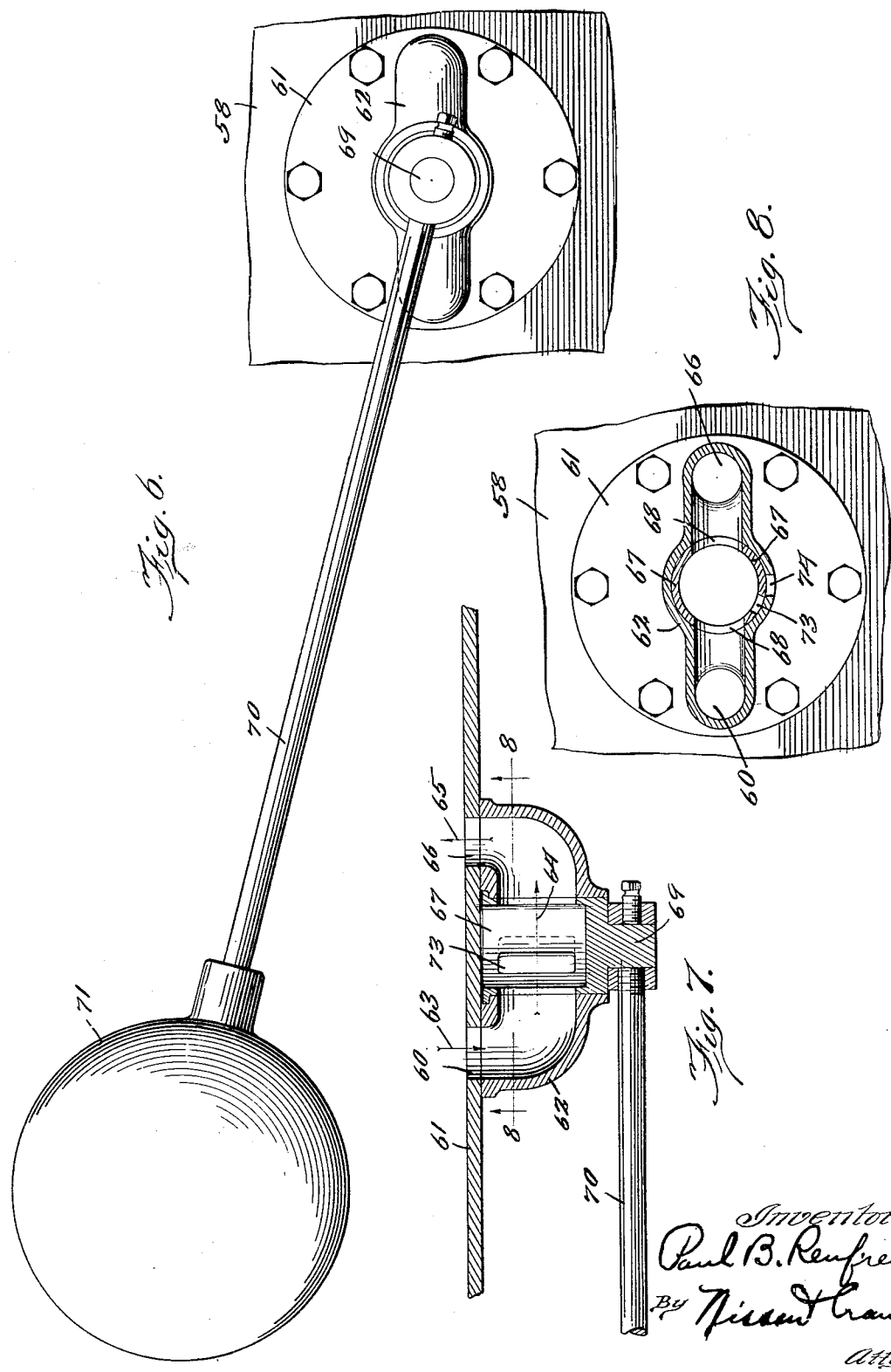

Patented Mar. 20, 1934

1,951,809

UNITED STATES PATENT OFFICE 1,951,809

APPARATUS FOR EMPLOYING VACUUM ON POROUS LAMINATED FILTERING MECHANISM

Paul B. Renfrew, Fort Wayne, Ind., assignor to S. F. Bowser & Company, Inc., Fort Wayne, Ind., a corporation of Indiana Application August 29, 1928, Serial No. 302,743

16 Claims. (Cl. 196—16)

My invention relates to apparatus for filtering liquids, particularly transformer oil, although it may have a general application for the restoration of efficiency of lubricating oils such as turbine oil, switch oil, crank case oil, machine oil, etc.

One of the objects of my invention is the provision of improved and efficient apparatus for removing impurities, both solid and liquid, from transformer oil in order to restore its dielectric efficiency.

Another object of the invention is the provision of an automatic circulating system for the taking from the transformer or other reservoir the oil or liquid to be purified, removing the impurities therefrom and returning the purified oil or liquid to the transformer or reservoir.

Another object of the invention is the provision of improved means for applying the vacuum to porous filtering mechanism to remove from oil microscopic traces of water so as to restore the dielectric efficiency of the oil.

A further object of the invention is the provision of a float controlled valve to control the flow of purified liquid back to its source after being purified.

Another object of the invention is the provision of a float controlled valve in connection with a reservoir for receiving filtered liquid to prevent the liquid in said reservoir from falling below a predetermined level.

A further object of the invention is the provision of improved means for mounting in multiple a series of laminated porous disc filters.

Another object of the invention is the provision of laminated filtering mechanism with a pump for introducing liquid thereto under pressure, vacuum apparatus for applying a vacuum to the discharge sides of the filtering mechanism, a reservoir for receiving the purified liquid, another pump for delivering purified oil from the reservoir, and a float controlled valve for bypassing the liquid back to the reservoir when the depth of the liquid in the latter falls below a predetermined amount.

Other objects of the invention will appear hereinafter, the novel features and combinations being set forth in the appended claims.

In the accompanying drawings—

Figure 3:
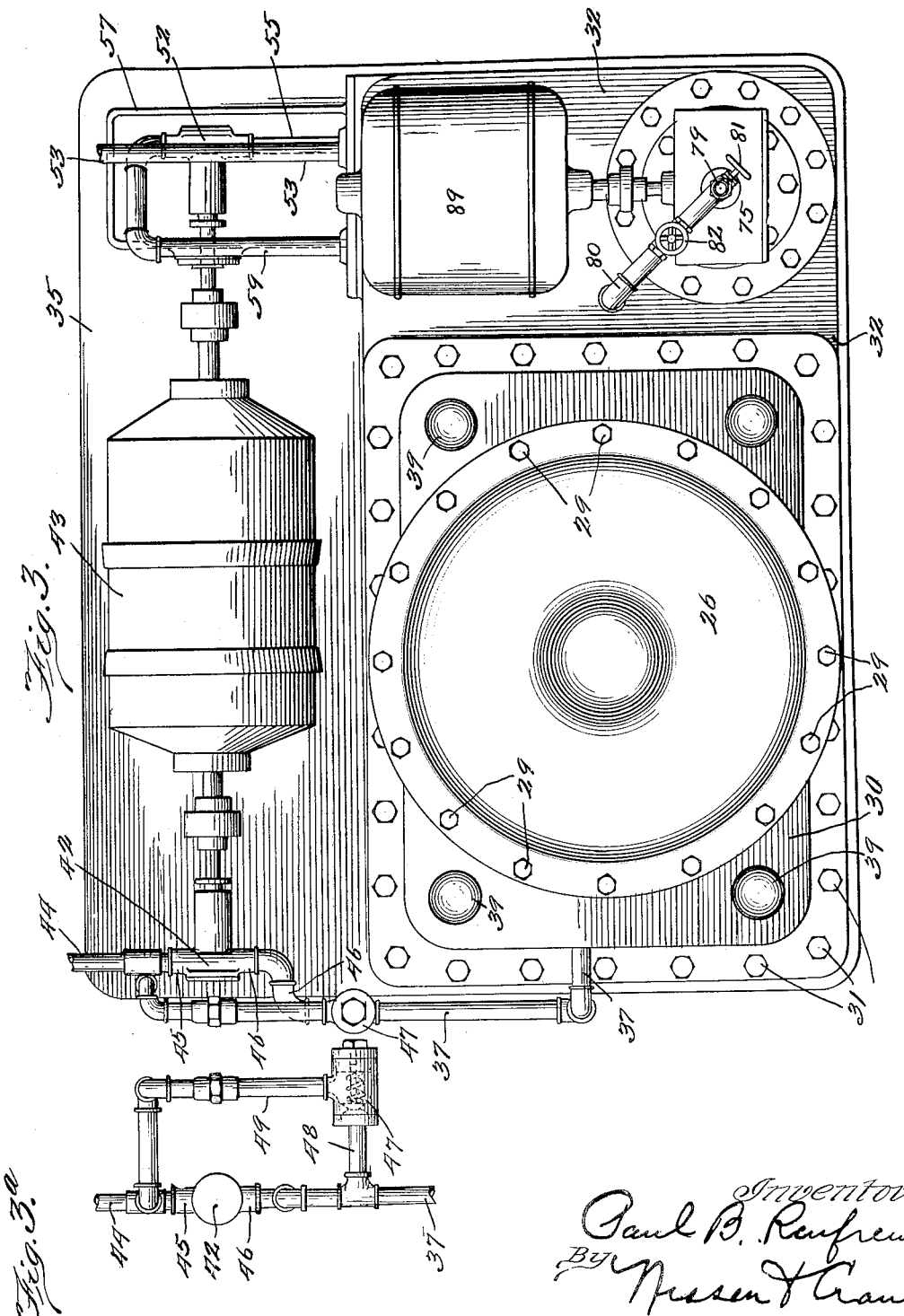
Fig. 3 is a plan view of the apparatus shown in Fig. 1.

Fig. 3ª is an end elevation of a detail of Fig. 3.

Figure 1:
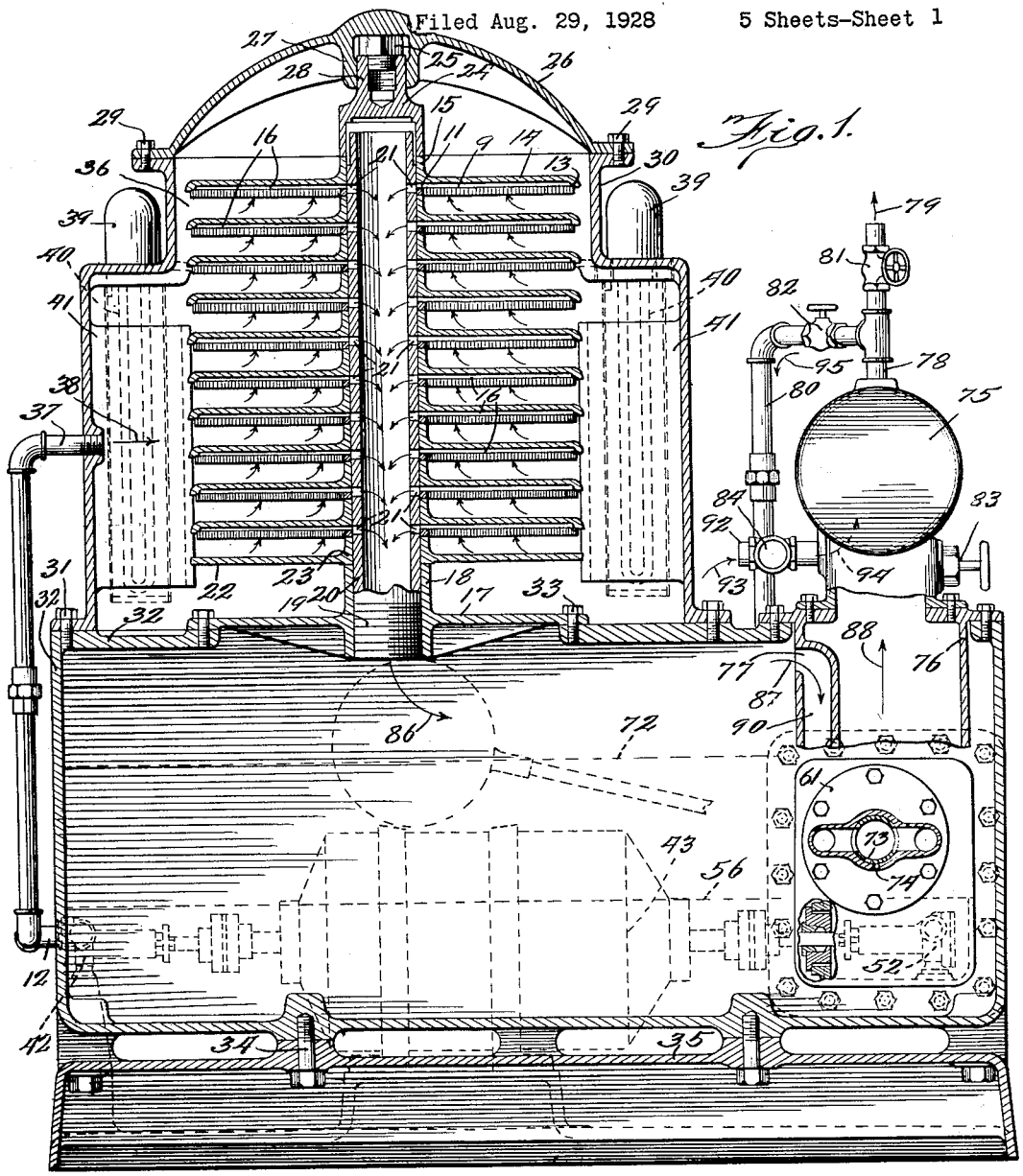
Fig. 1 represents an elevation mostly in section, of my improved apparatus which is adapted to be connected to a transformer containing oil or other reservoir containing liquid to be filtered and purified.
Figure 4:
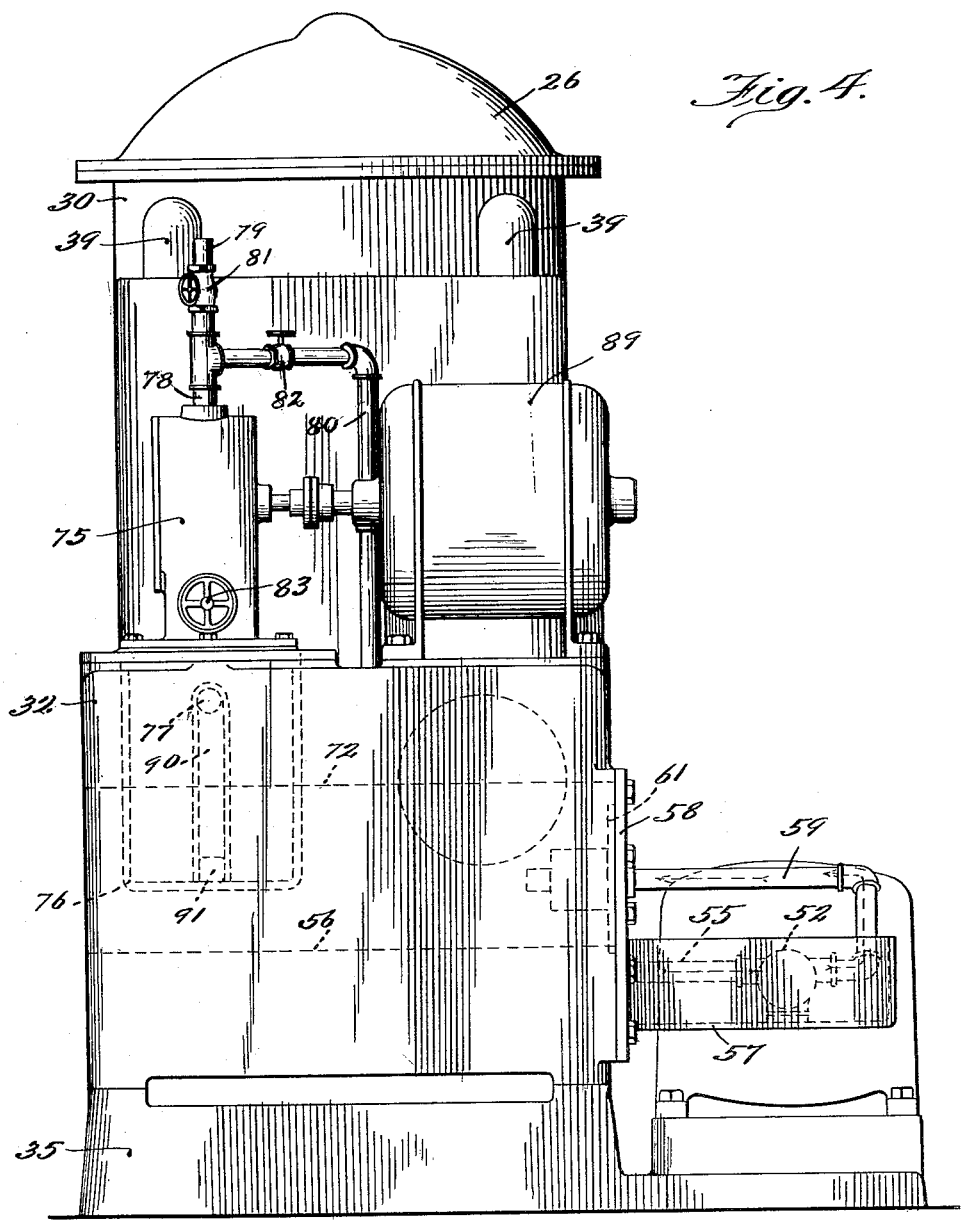

Fig. 4 is a side elevation viewed from the right-hand side of Fig. 1;

Fig. 5 represents a complete circulating system when the apparatus shown in Fig. 1 is connected to a transformer for the purpose of purifying the oil therein and restoring the dielectric properties thereof;

Fig. 6 is an elevational view of the float controlled valve mechanism;

Fig. 7 is a plan view partly in section of the float controlled valve; and

Fig. 8 is a sectional elevation taken on the line 8—8 of Fig. 7, looking in the direction of the arrows.

Figure 2:
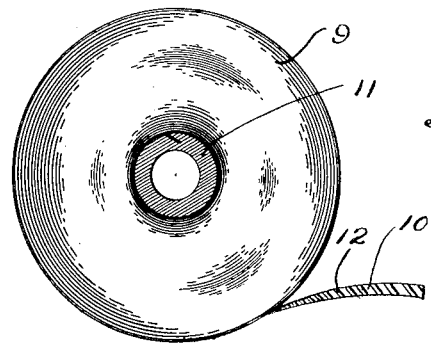
Fig. 2 represents in plan one of the filter elements comprising a metal tape having spaced cross-bars on one side thereof and wound tightly into the form of a disc to provide a multiplicity of minute passageways between the flat faces of the disc and over the entire area thereof.

It should be understood that the apparatus shown in the accompanying drawings is particularly adapted for use in connection with porous laminated filters having such minute passageways between the entrance and discharge sides of the filter elements that the flow of the liquid is extremely restricted as to any single passageway and that therefore hydraulic pressure is necessary to force the liquid through the passageways. In Fig. 2 I have shown this type of filter element in the form of a ribbon wound disc 9 comprising a thin metal ribbon 10 wound tightly on the hub 11 and having one side smooth and the other side provided with spaced-apart raised cross-ribs 12. The ribbon may be approximately three-eighths of an inch in width, thirty-six ten-thousandths of an inch in thickness, and the raised cross-ribs may be four ten-thousandths of an inch in thickness to form spaced-apart grooves of a depth of four ten-thousandths of an inch, the total thickness of the ribbon, including the cross-ribs, being four one-thousandths of an inch in thickness. When the tape is wound compactly each passageway may be approximately one-eighth of an inch in width and four ten-thousandths of an inch in depth between the edges of the ribbon and from one side of the flat disc filter element 9 to the other side thereof.

Such filter elements may have their dimensions varied, those set forth being by way of illustration of the capillary nature of the minute passageways.

The filter elements 9 on their hubs 11 are soldered or otherwise secured at 13 to the peripheral portions of the inverted cups 14, the hubs 15 of which are concentric with the hubs 11 and spaced therefrom, as shown in Fig. 1. Each filter unit comprising the filter element 9 and the cup 14 has an interior chamber 16 on the entrance side of the filter element.

At the center of the plate 17 is a cylindrical support 18 screw-threaded to receive the lower screw-threaded end 19 of the vertical pipe 20. The various filter elements are adapted to fit over the vertical pipe 20, as shown in Fig. 1. This pipe 20 is provided with a series of perforations or ports 21 which are respectively in communication with the chambers 16 of the filter units.

The filter units are preferably so arranged that their entrance sides face downwardly so that the heavier particles of impurities may fall by sedimentation to the upper sides of the cups 14. It should be understood that fine particles of carbon and other solid impurities may cake on the lower sides of the filter elements and act to filter the incoming liquid so long as such caking remains sufficiently porous below the lowermost filter unit. A flat disc 22 may be mounted in position concentric with the filter units by reason of the hub 23 which fits over the vertical tube or pipe 20. This disc 22 may act as a collector for the impurities which fall by sedimentation from the lower face of the lowermost filter unit. When the multiple filtering mechanism shown in Fig. 1 is to be mechanically cleaned, the impurities may be scraped from the bottoms of the filter units for collection on the tops of the cups 14 and the plate 22 and then scraped from the latter. Before such mechanical cleaning is carried out, the chamber 16 may receive fluid pressure introduced through the pipe 20 to force the caked layer of solid impurities from the lower faces of the filter elements for collection on the tops of the cups 14. This may be done several times before it becomes necessary to effect mechanical cleaning of the collected impurities on the tops of the cups 14 and on the upper surface of the plate 22. Over the upper end of the tube 20 is placed a closed cap 24 so as to fit on top of the uppermost hub 15.

Screw-threaded into the top of the cap 24 is a nut 25 which serves as an abutment adjustable in elevation. A canopy top 26 is provided with an interior central downwardly projecting cylindrical member 27 which may fit over the top of the nut 25 and also over the upwardly extending cylindrical portion 28 of the cap 24. When this canopy top is secured by means of the bolts 29 to the casing 30 and the latter secured by the bolts 31 to the reservoir or tank 32, the whole series of filter units is rigidly connected to the plate 17 and the latter is bolted by means of the bolts 33 to an opening in the top of the reservoir 32. The reservoir 32 is secured by the bolts 34 to the bed plate 35. It will thus be seen that since the reservoir 32 is secured rigidly to the bed plate 35 and the casing 30 is rigidly bolted to the reservoir 32, the canopy 26 and the plate 27 rigidly connect the filtering mechanism to the tank or reservoir 32.

The chamber 36 is entirely enclosed and is separate from the interior of the tank 32, except through the pores or passageways of the filter elements, the chambers 16, the ports 21 and the interior of the pipe 20. It will therefore be evident that when oil or other liquid to be filtered is introduced into the chamber 36 from the pipe 37 in Fig. 1 in the direction indicated by the arrow 38 the liquid cannot escape, except as indicated by the upwardly directed arrows under the filter elements 9 and the downwardly directed arrows in the tube 20.

When the liquid to be filtered is more or less viscous it may be heated by the heating elements 39, 39 which may be of the electric type with downwardly extending electric heating coils 40, as indicated diagrammatically by the dotted lines in Fig. 1. These heating elements may be placed back of vertical baffle plates 41, 41 or in such positions as to effect thorough mixing of the heated liquid by convection currents.

In Fig. 3 I have shown a pump 42 operated by the electric motor 43. This pump is adapted to pump the liquid to be filtered from a pipe 44 into the pipe 45 and out through the pipe 46 to the pipe 37. In a by-pass around the pump 42 is connected a check-valve 47 between the pipes 48 and 49, as shown in Fig. 3ª. This check-valve 47 is adapted to open upwardly from the pipe 48 to the pipe 49 when the pressure in the pipe 37 and therefore in the chamber 36 exceeds a predetermined maximum. This may occur when the filters become so clogged with impurities that the rate of filtration is slowed down considerably. The check-valve 47 in the by-pass around the pump 42 will circulate the liquid back to the entrance side of the pump until the pressure in the chamber 36 is reduced. Therefore, neither the pump 42 nor the motor 43 will become stalled when the pressure in the chamber 36 where the filters are located reaches a predetermined maximum.

As shown in Fig. 3, the bed plate 35 is of sufficient area to have mounted thereon not only the reservoir 32 and the closed casing 30, but also the electric motor 43 and the pump 42. By referring to Fig. 5 it will be seen that the pump 42 may be connected by the pipe 44 to the oil reservoir of a transformer 50. When the valve 51 is open the used transformer oil may be pumped through the pipe 44 into the pipe 37 and thence into the closed chamber 36, and when the pump exerts sufficient pressure the oil will be filtered by the filter elements 9. These filter elements are mounted in multiple, there being ten shown in Fig. 1. The filter elements are immersed in the oil in the chamber 36 and therefore the hydraulic pressure is substantially equal over all of the lower or entrance sides of the filter elements. Such pressure may be approximately one-hundred and fifty pounds per square inch and although the flow through each minute passageway is extremely restricted on account of the capillary nature of such passageways, it should be understood that there are a great many of such passageways in each filter element so that in the aggregate a large porous surface is exposed to the liquid pressure. The filtered oil flows simultaneously into and out of all of the chambers 16 at the discharge sides of the filter elements and thence into the tube 20 and down the latter into the reservoir 32.

The same electric motor 43 which drives the pump 42 may also be connected to drive the pump 52 to pump the filtered oil from the reservoir 32 into the pipe 53 and thence into the top of the transformer reservoir 50 when the valve 54 is open. The arrows in Fig. 5 indicate the flow of the oil from the transformer and back to the transformer.

As shown in Fig. 3, the pump 52 is not connected directly to the pipe 53. The dirty oil pump 42 and the clean oil pump 52 may both be mounted to be driven by the motor 43. This low position is particularly desirable for the clean oil pump 52 so that its suction connection through the pipe 55 may always receive priming liquid from the oil in the reservoir 32. In fact the depth of the oil in the reservoir 32 should not fall below that necessary for keeping the clean oil pump 52 primed with oil. This is particularly true when the vacuum apparatus hereinafter described is employed in the oil purification system. The minimum level of the oil in the chamber 32 is indicated by the dotted lines 56 in Figs. 1 and 4. The suction pipe 55 will then always be below the minimum level of the liquid in the reservoir 32 and the pump 52 may be continuously operated with the assurance that it will always pump oil from the reservoir 32, as indicated by the dotted arrows in Fig. 4.

The float controlled valve shown in Figs. 1, 6, 7 and 8 will determine whether the oil will flow through the pipe 53 to the top of the transformer or back into the reservoir 32. This float controlled valve so operates that when the depth of the oil in the reservoir 32 is above that indicated by the lines 56, the oil will be pumped to the transformer, whereas when it falls to the depth indicated by the level 56, the oil will be automatically directed back into the reservoir 32.

The clean oil pump 52 is mounted in a pan bracket 57 which is secured to the vertical plate 58 attached to an opening in one side of the reservoir 32. Whether the oil is pumped to the transformer or back into the reservoir 32, it first passes from the pump 52 into the pipe 59 and thence through the opening 60 in the plate 61 which is bolted to the plate 58. Secured to the plate 61 is a manifold 62 having passageways for the flow of the oil, as indicated by the arrows 63, 64 and 65. The port 66 is in communication with the port 60 through the manifold 62. The port 66 is connected directly to the pipe 53.

At the center of the manifold 62, midway between the ports 60 and 66, is a cylindrical valve 67 having diametrical ports 68, 68 for maintaining communication at all times between the ports 60 and 66.

Connected to the stem 69 of the cylindrical valve 67 is a rod 70 at the upper outer end of which is a float ball 71 which is adapted to float in the oil in the reservoir 32. When this float is at the elevation indicated by the dotted lines in Fig. 1 by reason of the high oil level indicated by the dotted lines 72, the valve ports 68 will be in the positions shown in Fig. 8. In the lower portion of the valve 67 is an elongated port 73 and in the bottom of the manifold is a similar port 74. When the depth of the oil in the reservoir falls below the level indicated by the dotted lines 72, the valve 73, 74 tends to open and when the level 56 is reached, the float 71 drops to such a low position that the valve port 73 will be in full registry with the port 74 in the manifold. Then the maximum amount of oil will by-pass from the pump 52 through the pipe 59, port 60, manifold 62, port 68 and ports 73 and 74 back into the reservoir 32, because the port 73 communicates directly with the interior of the reservoir 32. While therefore the valve 67 maintains communication between the ports 60 and 66 at all times, the opening of the ports 73, 74 will establish a by-pass back to the reservoir 32 when the depth of the oil in the latter falls below a predetermined level. When no oil is to be pumped into the transformer, the valve 54 may be closed and nevertheless the clean oil pump may continue its operation when the by-pass is open through the ports 73 and 74. So also when the valve 54 is closed, the by-pass illustrated in Fig. 3a will permit continued operation of the dirty oil pump 42 without stalling the same. When, however, filtering operations continue with the valve 51 open and the valve 54 closed, the closing of the ports 73 and 74 by the level of the liquid reaching that designated 72 in Fig. 1 will automatically stall the pump 52 and stop the electric motor 43 which is protected by the usual electric circuit breaking devices. It will also be seen that even when the valve 54 is kept open but the depth in the transformer reaches the point where no more oil can be pumped into the same, the clean oil pump 52 will be stalled when the depth of the oil in the reservoir 32 reaches the level 72 where the valve 73, 74 will be closed. However, it is intended that the amount of oil in the reservoir and in the transformer 50 shall be proportioned so that the pumping system may go on continuously to constantly circulate the oil so long as the electric current is supplied to the motor 43 to operate the same.

The nature of the liquid being filtered will largely determine the rate of filtration and where there are considerable solid impurities in the liquid being filtered, the filter elements will tend to clog gradually and the rate of filtration decrease, which will tend to decrease the amount of filtered oil supplied to the reservoir 32. It therefore becomes desirable to provide the automatic float control valve to bypass the oil from the clean oil pump 52 back to the reservoir 32 when the depth of the liquid in the reservoir tends to fall toward the minimum permissible depth indicated by the dotted line 56.

Inasmuch as minute particles of water condensed from the atmosphere will collect in transformer oil used to cool and insulate electric windings of high voltage transformers, it is important to remove such water from such insulating oil. Even microscopic traces of water in transformer oil seriously interfere with the dielectric strength thereof. I have therefore provided apparatus for applying a vacuum to the discharge sides of the filter elements 9 so as to remove the water from the transformer oil without interfering with the operation of the transformer and without necessitating its being shut down or disconnected from a high tension system. In other words, the oil in the transformer may be treated to restore its dielectric strength without shutting down the transformer or disconnecting it from the system in which it is being used.

For this purpose a vacuum pump 75 is mounted on the box 76, which in turn is mounted in an opening in the reservoir 32 and connected thereto so as to be hermetically sealed. The box 76 is adapted to contain water absorbing material, such as calcium chloride, and is provided with a suction port 77 in direct communication with the upper interior portion of the reservoir 32. A pipe 78 is connected between the top of the vacuum pump 75 to the atmosphere, as indicated by the arrow 79. A by-pass pipe 80 is connected between the pipe 78 and the interior upper portion of the reservoir 32. When the valve 81 is open and the valve 82 is closed and the valve 83 is also open and the valve 84 is closed, the vacuum pump may be operated to apply the vacuum, as indicated by the downwardly curved arrows in the tube 21 and the arrows indicated by the reference numbers 86, 87 and 88. The vacuum pump 75 may be operated by the electric motor 89 shown in Fig. 4. While the vacuum is applied to the upper surface of the oil in the reservoir 32, it is not there where the water is entirely withdrawn from the oil, although if there is any water still in the oil in the reservoir 32 it may be withdrawn therefrom to some extent by the vacuum in the space above the liquid level. Where the oil emerges from the filter elements, however, it is spread in a thin film and it is the application of the vacuum in the chamber 16 that is most effective in withdrawing the water from the oil. When a high vacuum is produced and the temperature of the oil has been raised by the heating elements 39, the boiling point of the microscopic traces of the water has been so lowered by the application of the vacuum that all of the small traces of water in the oil as soon as it emerges from the filter elements into the chambers 16 will vaporize and cause frothing so as to greatly increase the film surface of the oil and decrease the thickness thereof and thus expose a maximum area and quantity of oil to the vacuum to remove even microscopic traces of the water from the oil and thus restore the insulating properties of the transformer oil or its high dielectric strength. Small amounts of solid impurities in the oil, such as carbon, dust, etc., are removed by the filter elements and will remain on the under sides of the filter discs and cake thereon and by the application of the vacuum the very small last traces of water in the oil will be removed with the result that when the oil is pumped back to the transformer it will be in very excellent condition as to insulating properties and high dielectric strength.

When desired, the box 76 may be detached and removed and the vacuum pump removed therefrom so as to permit renewal of the calcium chloride. As shown in Figs. 1 and 4, the suction port 77 is at the upper end of the vertical passageway 90 at one side of the box 76 so that the water vapor may be compelled to pass down through the port 91 and then up through the calcium chloride in the box 76.

The vacuum pump 75 may also be operated as a blower by closing the valve 83 and opening the valve 84 so as to permit the pipe 92 which is open to the atmosphere to act as a suction pipe. When the valve 81 is closed and the valve 82 is open, air may be drawn by the pump 75, as indicated by the arrows 93, 94 and 95, from the atmosphere and blown into the chamber above the liquid in the reservoir 32 and thence upwardly through the pipe 20 into the various chambers 16 to produce sufficient pneumatic pressure through the multiplicity of pores or passageways in the laminated filter elements to force the caked solid impurities from the bottoms of the filter elements from which such impurities will drop on the tops of the cups 14. At intervals, depending upon the amount of solid impurities filtered from the liquid being treated, the pump 75 may be operated to flush the filter units with compressed air to force the solid caked impurities from the entrance sides of the filter elements and thus restore the efficiency of the filtering apparatus until such time as it may become desirable to remove the canopy 26 and the housing 30 to permit mechanical cleaning of the filtering units.

It should be noted that while the method above described is particularly adapted for dehydrating electrical insulating oils, such as those used in electrical transformers, to restore the electric insulating and dielectric properties thereof, it may have a general application in that a more volatile ingredient may be removed from a mixture of liquids by the application of the vacuum producing apparatus. The multiplicity of minute passageways in each filter element produces upwardly flowing streams to a film at the upper ends of such streams at the upper surfaces of the filter elements for flow therefrom by gravity through the ports 21 into the tube 20. By application of the vacuum to the discharge sides of the filter elements the smallest traces of water may be removed from the insulating oil, and as before stated, the preheating by the four electric heaters 39 shown in Fig. 3 facilitates not only the removal of the solid impurities, but also all of the water from the oil.

Obviously those skilled in the art may make various changes in the details and arrangement of parts without departing from the spirit and scope of the invention as defined by the claims hereto appended and I wish therefore not to be restricted to the precise construction herein disclosed.

I do not herein claim the novel method of purifying liquids disclosed herein, since the same forms the subject-matter of a divisional application.

Having thus fully disclosed an embodiment of my invention, what I desire to secure by Letters Patent of the United States is:

1. In apparatus for dehydration of oils used for electrical insulation, the combination with a filter having a multiplicity of minute passageways therethrough, of means for applying a vacuum to the discharge side of the filter to remove the last traces of water in the oil, means for heating the oil without volatilization thereof to facilitate its flow through the filter and the removal of the water therefrom by the said vacuum, and means for mounting the filter to compel the oil to flow through the filter in an upward direction.

2. In apparatus for dehydrating oils, the combination with a filter utilizing its upper surface as a film-forming means, of means for supplying oil upwardly through the filter to said means to rest therein and thereon by gravity in film form, and means for applying a vacuum to such film to dehydrate the oil while in the form of the film and before the oil flows from said upper surface.

3. In oil cleaning apparatus, the combination with a porous filter having an upper film-forming discharge surface, of means for draining the filtered liquid from such surface to maintain the liquid in thin film form, and means for applying a vacuum to such film to dehydrate the liquid while in film form.

4. In apparatus for dehydrating insulating oils, the combination with a laminated metal porous filter having a multiplicity of minute passageways therethrough, and means for applying a vacuum to the upper side of the filter from which the oil emerges to dehydrate the oil while spread as a film over such emerging side.

5. In apparatus for removing from mixtures of liquids a volatile ingredient, the combination with a film-forming means comprising a multiplicity of closely adjacent capillary passageways between horizontal spaced-apart entrance and discharge faces, of means for applying a vacuum to the upper discharge face to effect volatilization of the volatile ingredient from the liquid emerging from said passageways, and means for receiving the flow of the remaining liquid from the said upper face.

6. In apparatus for removing from mixtures of liquids a volatile ingredient, the combination with a porous filter having a multiplicity of minute passageways extending directly therethrough, of means for exerting pressure on the mixture to force the same through the filter and spread the same in the form of a film on the upper side thereof, and means for applying a vacuum to the film to remove the more volatile ingredient from the mixture.

7. In apparatus for removing a volatile constituent from oil, the combination of a horizontal flat filter having an upper film-forming discharge means surface, and means for applying a vacuum to such film-forming discharge surface to extract from the liquid the volatile constituent therein.

8. In apparatus for removing a volatile constituent from oil, the combination with a horizontal laminated porous metal filter having a multiplicity of passages therethrough with a horizontal film-forming discharge surface on the upper side, of means for directing liquid to the bottom of the filter for filtration through the filter, and means for applying a vacuum to the film on said film-forming discharge surface to remove the volatile constituents from the liquid while in the film and from the liquid flowing from the film-forming discharge surface.

9. In apparatus for removing impurities from transformer oils, the combination with an oil reservoir, of a pump connected thereto for pumping oil from a transformer to said reservoir under pressure, an additional oil reservoir, filtering apparatus between said reservoirs for filtering the oil as it flows from said first-named reservoir to said additional oil reservoir, a vacuum pump connected to dehydrate the oil as it emerges from the filter elements of the filtering apparatus, an additional pump connected to said additional oil reservoir for pumping the cleaned oil therein to said transformer, and a float-operated by-pass controlled by the depth of the oil in said additional oil reservoir to by-pass the oil back to the last-named reservoir when the depth of the oil therein falls below a predetermined level.

10. In apparatus for removing impurities from oil, the combination with a reservoir, of a pump connected thereto in position to have a head maintained thereon by the depth of liquid in said reservoir, said pump being adapted to withdraw liquid from said reservoir, filtering apparatus for the liquid directed into said reservoir, vacuum producing mechanism connected to said filtering apparatus through the upper portion of said reservoir, and a float-operated by-pass for returning to said reservoir the liquid pumped by said pump when the liquid in said reservoir falls below a predetermined level.

11. In apparatus for removing impurities from oil, the combination with a reservoir, of a pump connected thereto for withdrawing liquid therefrom, filtering apparatus for filtering the oil before flowing into said reservoir, and a by-pass valve in said reservoir controlled by a float in the latter for maintaining a head of oil in said reservoir when it falls below a predetermined level and thereby maintaining a priming head for said pump.

12. In a continuous circulating system for removing impurities from a liquid, the combination with a reservoir adapted to contain a used liquid which is to be filtered, of a filter reservoir, filtering mechanism in the filter reservoir, a storage reservoir for receiving filtered liquid from said filtering mechanism, a pump connected between the first-named reservoir and said filter reservoir for pumping used liquid from said first-named reservoir to said filter reservoir and exerting pressure on said filtering mechanism to force the liquid therethrough, a pump connected between said storage reservoir and said first-named reservoir for pumping filtered liquid from the storage reservoir to said first-named reservoir, and a float-operated valve for controlling the return of the liquid to said storage reservoir when the depth of the liquid in the storage reservoir falls below a predetermined level.

13. In apparatus for dehydration of used oils, the combination with a reservoir, of a pump connected thereto for withdrawing oil therefrom, filtering apparatus for the oil directed into said reservoir, vacuum producing mechanism connected to said filtering apparatus through said reservoir, and float-operated means for returning to said reservoir the oil pumped by said pump when the oil in said reservoir falls below a predetermined level.

14. In a continuous circulating system for removing impurities from oil, the combination with a reservoir adapted to contain oil at the place where it is to be utilized, of a filter reservoir, filtering mechanism in the filter reservoir, a storage reservoir for receiving filtered oil from said filtering mechanism, a pump connected between the first-named reservoir and said filter reservoir for pumping used oil from said first-named reservoir to said filter reservoir and exerting pressure on said filtering mechanism to force the oil therethrough, another pump connected between said storage reservoir and said first-named reservoir for pumping filtered oil from the storage reservoir to the said first-named reservoir, and automatic means for controlling the return of oil to said storage reservoir when the depth of the oil therein falls below a predetermined level.

15. In a continuous circulating system for removing impurities from liquid, the combination with a reservoir adapted to contain used liquid which is to be filtered, of a filter reservoir, filtering mechanism in said filter reservoir, a storage reservoir for receiving filtered liquid from said filtering mechanism, a pump for pumping used liquid from said first-named reservoir to said filter reservoir, another pump for pumping filtered liquid from the storage reservoir to said first-named reservoir, and automatic mechanism for controlling the return of liquid to said storage reservoir when the depth of the liquid therein falls below a predetermined level.

16. In a circulating system for removing impurities from oil, the combination with a reservoir adapted to contain oil at the place where it is to be utilized, of an enclosed filter reservoir, filtering mechanism in said filter reservoir, a storage reservoir for receiving filtered oil from said filtering mechanism, means for effecting flow of oil from said first-named reservoir into said filter reservoir to exert pressure on the filtering mechanism to force the oil therethrough, means for effecting flow of filtered oil from said storage reservoir to said first-named reservoir, and automatic means controlled by the depth of the oil in the storage reservoir for regulating the flow of oil from the storage reservoir to said first-named reservoir.

PAUL B. RENFREW.